July 10, 1934.  W. MARSHALL ET AL  1,966,257
VEHICLE DOORLATCH
Filed Feb. 2, 1925  2 Sheets-Sheet 1

Inventors
WILLIAM MARSHALL
JOHN LEVANDOSKI
Attorneys

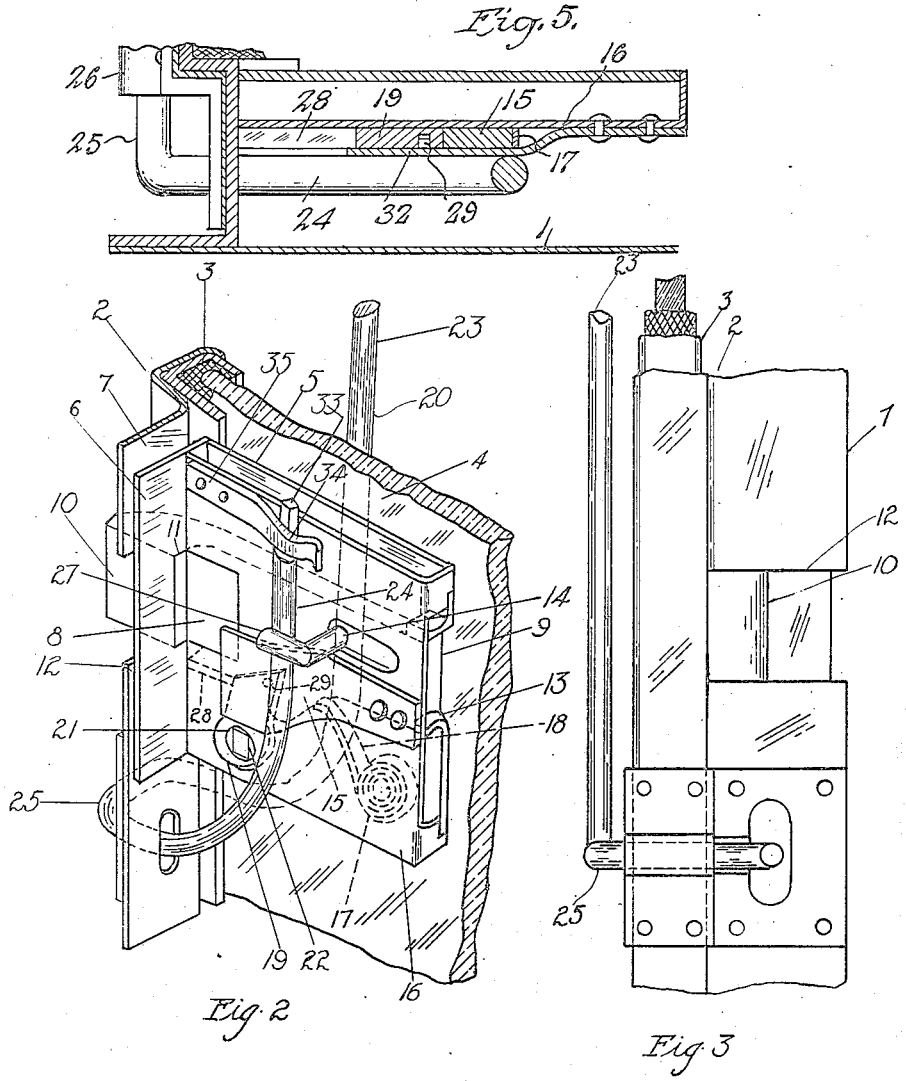

Patented July 10, 1934

1,966,257

UNITED STATES PATENT OFFICE 1,966,257

VEHICLE DOORLATCH

William Marshall and John Levandoski, Detroit, Mich., assignors to Briggs Manufacturing Company, Detroit, Mich., a corporation of Michigan Application February 2, 1925, Serial No. 6,425

35 Claims. (Cl. 292—173)

This invention relates generally to latches designed particularly for use with vehicle doors and consists of certain novel features of construction, combinations and arrangements of parts as will be more fully described and particularly pointed out in the appended claims.

In the accompanying drawings;

Figure 2 is a perspective view thereof.

Figure 3 is a front elevation thereof.

Figure 5 is a view similar to Figure 1 showing the dogging arrangement.

Figure 4:
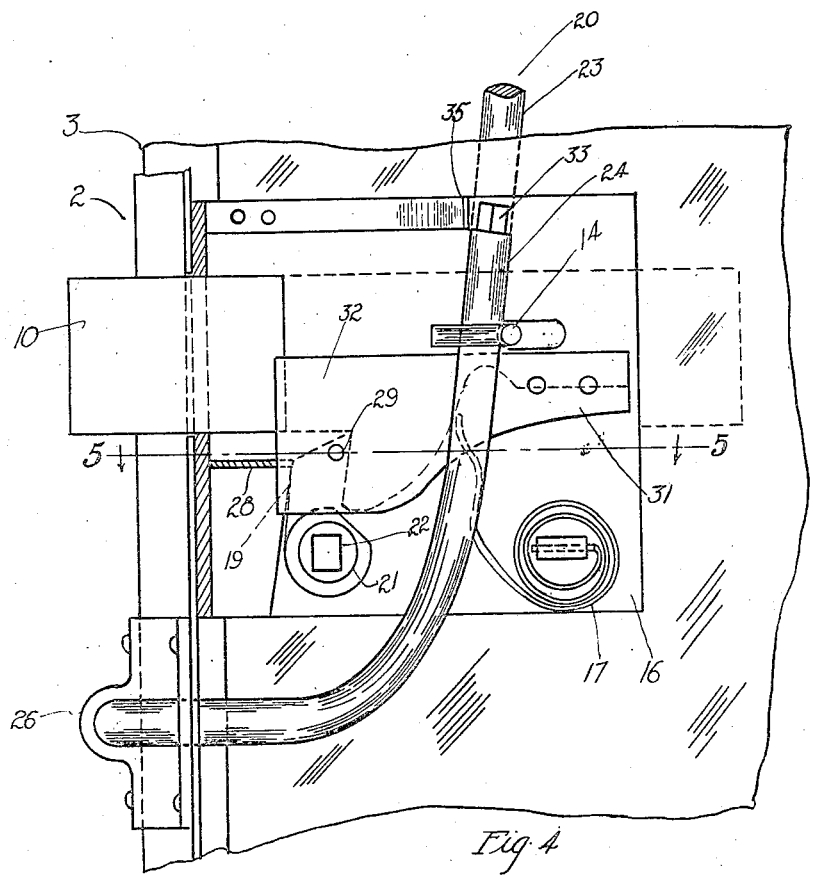
Figure 4 is a fragmentary side elevation.
Figure 1:
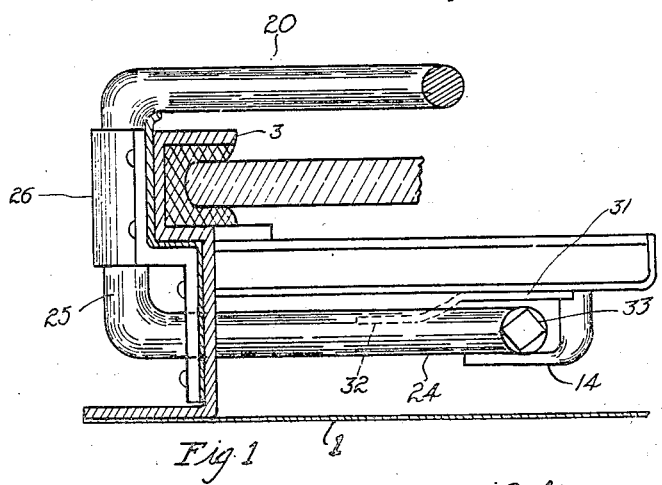
Figure 1 is a horizontal sectional view taken through a vehicle door with a latch embodying my invention applied thereto.

Referring now to the drawings in which like characters of reference designate corresponding parts throughout the several views, the numeral 1 designates a door, preferably of a vehicle body, having a pillar 2 provided at its inner edge with a channel-shaped portion 3 which constitutes a run-way for a vertically movable glass panel 4.

In order that a suitable latch may be mounted and operated upon the pillar 2 without interfering with the vertical movement of the glass panel 4, we preferably provide a case plate 5 that is located upon the outer side of the guide-way 3 and is provided at its forward edge with a laterally extending flange 6 that is rigidly secured to the transversely extending portion 7 of the door pillar. Slidably mounted on the case plate 5 is a locking bolt 8, preferably having a shank 9 and an enlarged head 10. As shown, the head 10 preferably extends through aligned openings 11 and 12 respectively in the lateral flange 6 of the case plate and the transversely extending portion 7 of the door pillar and is adapted to engage a suitable keeper (not shown) upon the door jamb of a vehicle body, while the shank 9 preferably extends between spaced guide lugs 13 struck out from the case plate 5 and is provided at spaced points throughout its length with a laterally extending lug 14 and a depending extension 15. To provide a compact construction, the shank 9 is preferably flat so that it may move behind a suitable cover plate 16 secured to the case plate 5 and flange 6 respectively, while a helical spring 17 anchored upon the case plate 5 has an arm 18 engaging the rear edge of the depending extension 15 and is adapted to normally hold the bolt 8 in projected position.

For retracting the bolt against the tension of the spring 17, we preferably provide a suitable roll-back 19 that is adapted to be operated from the outside of the door, and a pivoted lever 20 that is adapted to be operated from the inside of the door. As shown, the roll-back 19 is engageable with the depending extension 15 of the bolt shank and is provided with a hub 21 that is journaled in aligned openings in the case plate and cover plate. Any suitable means (not shown) may be engaged with the square opening 22 in the hub 21 for rocking the roll-back against the shank extension 15.

The lever 20 is preferably U-shape in form and straddles the run-way 3 for the glass panel. In order that this lever may be operated from the inside of the door for retracting the bolt upon the outer side of the run-way without interfering with the movement of the glass panel 4, the arms 23 and 24 respectively of the lever are preferably curved longitudinally outwardly so that the base 25 of the U is located in advance of the free edge of the door. Any suitable means such as the bracket 26 may be secured to the transversely extending portion 7 and guideway 3 of the door pillar for pivotally connecting the base 25 of the U to the door. As shown, the inner arm 23 of the lever is preferably longer than the outer arm 24 and is preferably provided above the case plate with a suitable operating handle (not shown) while the outer arm 24 is engageable with the lug 14 projecting laterally from the outer side of the bolt shank. To prevent accidental disengagement of the parts, the lug 14 is preferably provided at its outer end with a forward extension 27 that is substantially parallel to the cover plate 16 and is engageable with the outer side of the arm 24. Thus, with this construction, the roll-back 19 may be actuated to retract the bolt without affecting the lever 20, and the outer arm 24 of the latter may in turn be swung to the rear against the lug 14 without affecting the roll-back. The spring 17 will always exert a pressure through the lug 14 on the bolt shank against the arm 24 of the lever so that the latter will normally be in operative position to retract the bolt. Likewise the spring 17 will exert a pressure through the depending extension 15 of the bolt shank against the roll-back 19 and will hold the latter against a suitable lug 28 that is preferably struck out from the case plate 5 adjacent to the lateral flange 6 thereof.

In order that the outside operating means may be rendered inoperative from the inside of the vehicle, we preferably provide a pin 29 that is adapted to be moved by the outer arm 24 of the lever into engagement with a transversely extending recess or socket 30 in the roll-back.

As shown, this pin 29 projects laterally inwardly on a leaf spring 31 that is anchored on the cover plate 16. This spring 31 is preferably rigidly secured at its rear end to the cover plate 16 adjacent to the rear edge thereof, and is preferably provided at its forward end with an outwardly off-set portion 32 to which the pin 29 is rigidly secured. In order that the pin 29 will normally be held out of engagement with the roll-back 19, the portion 32 of the spring is preferably off-set outwardly a sufficient distance to normally space the free end of the pin 29 from the outer face of the roll back 19. Thus, with this construction, the roll-back 19 may be rendered inoperative by moving the lever 20 forwardly beyond neutral position so that the outer arm 24 will press inwardly the off-set portion 32 of the spring 31 and cause the pin 29 to be engaged with the socket 30 in the roll-back. In order that the pin 29 will be held against accidental displacement while the lever 20 is in extreme forward position, the outer arm 24 is preferably provided at its upper end with a wedge-shaped portion 33 that is adapted to be engaged by the laterally curved portion 34 of a leaf spring 35 anchored upon the cover plate 16 adjacent to the upper edge thereof. As shown in Figure 4, this spring 35 normally serves as an abutment for the forward edge of the arm 24 and thereby prevents any objectionable play of the lever. When the pin 29 is in engagement with the roll-back 19, and the lever 20 is held by the spring 35 in its forward dogging position, the lever may be readily operated from the inside of the vehicle to release the roll-back 19 and retract the bolt. This may be accomplished by moving the arm 23 to the rear so that the wedge-shaped portion of the arm 24 becomes disengaged from the curved portion 34 of the spring 35, whereupon the spring 31 will automatically move the pin 29 outwardly from the path of the roll-back. This roll-back may then be operated from the outside of the vehicle if desired, for retracting the bolt.

From the foregoing description, it will be readily apparent that a latch of this type may be mounted upon a door pillar having a very small cross section, consequently the vision of the occupants of the vehicle is materially increased. Moreover the roll-back 19 is located upon the outer side of the run-way 3 and the lever 20 operable from the inside of the door straddles the run-way, hence the vertical movement of the glass panel 4 will not be interrupted and a wider panel may be employed. It is also apparent that the outside operating means and inside operating means may be independently operated for retracting the bolt. It will also be noted that the spring 31 cannot automatically move the pin 29 out of engagement with the roll-back 19 until the inside lever 20 has been moved rearwardly to neutral position, hence this lever controls the movement of the pin 29 to both operative and inoperative positions in addition to retracting the bolt.

While it is believed that from the foregoing description the nature and advantages of the invention will be readily apparent, we desire it to be understood that we do not limit ourselves to what is herein shown and described and that such changes may be resorted to when desired as fall within the scope of what is claimed.

What we claim as our invention is:

1. The combination with a door having a runway for a vertically movable glass panel, of a latch having a case plate secured to the door upon the outer side of the run-way, a latch bolt carried by the case plate, means for retracting the bolt from the outside of the door including a roll-back located upon the outer side of the run-way, and means for rendering the roll-back inoperative including a laterally movable member, and means operable from the inner side of the run-way for moving said member into dogging engagement with said roll-back.

2. In a latch, the combination with a case plate, and a latch bolt carried thereby, a roll-back for retracting the bolt, means movable laterally of the case plate for dogging the roll-back, and means straddling the case plate movable in one direction for retracting the bolt, and movable in another direction for actuating the lateral dogging means aforesaid.

3. In a latch, the combination with a case plate, and a latch bolt carried thereby, of a roll-back for retracting the bolt, a member engageable with the roll back for rendering the same inoperative, yieldable means carried by the case plate normally holding said member inoperative, and means for actuating said yieldable means to move said member into operative dogging engagement with said roll back.

4. In a latch, the combination with a case plate, and a latch bolt carried thereby, of means for retracting said bolt including a roll-back, and means for rendering said roll-back inoperative including an element movable transversely of the case plate, and a second bolt retracting member having means for actuating the element aforesaid.

5. In a latch, the combination with a movable latch bolt, of means for retracting said bolt including a roll-back, and means for rendering said roll-back inoperative including a pin engageable with a recess in said roll-back, and a second bolt retracting member having an upstanding portion for actuating said pin.

6. In a latch, the combination with a case plate, a latch bolt carried thereby, and a roll-back for actuating the bolt also carried by the case plate, of means for rendering said roll-back inoperative including a pin engageable with the roll-back, a member anchored upon the case plate having a yieldable portion for actuating said pin, and a second bolt retracting member having a portion engageable with the yieldable portion aforesaid for actuating said pin.

7. In a latch, the combination with a case plate and a latch bolt carried thereby, of a roll-back for retracting said bolt, means for rendering said roll-back inoperative including a pin engageable with said roll-back, and a second bolt retracting member having a portion straddling the case plate and adapted to actuate said pin.

8. The combination of a door having a runway for a vertically movable glass panel, of a latch having a case plate secured to the door upon the outer side of the runway, a latch bolt carried by said case plate and having a lateral projection, of means for actuating the bolt from the inner side of the runway, including a member upon the inner side of the runway having an extension engageable with said projection.

9. The combination with the door having a runway for a vertically movable glass panel, of a latch having a case plate secured to the door, a latch bolt carried by said case plate upon the outer side of the runway having a lateral projection, a lever for actuating the bolt from the inner side of the runway having an operating arm upon the inner side of the runway and an arm upon the outer side of the runway engageable with said projection.

10. The combination with the door having a runway for a vertically movable glass panel, of a case plate secured to said door, a latch bolt carried by said case plate upon the outer side of the runway having a lateral projection, means for retracting the bolt from the inner side of the runway including a lever straddling the case plate having a portion engageable with the projection.

11. The combination with the door having a runway for a vertically movable glass panel, a latch having a case plate secured to said door, a latch bolt carried by said case plate upon the outer side of the runway having a projection, means for retracting the bolt from the inner side of the runway including a lever straddling the case plate having an arm engageable with the projection, a roll-back on the outer side of the runway for retracting the bolt, means for rendering said roll-back inoperative including means adapted to be actuated by the arm of said lever.

12. The combination with the door having a runway for a vertically movable glass panel, of a latch having a case plate secured to the door, a latch bolt carried by the case plate upon the outer side of the runway, a roll-back on the outer side of the runway for retracting the bolt, laterally movable dogging means for the roll-back, actuating means for the dogging means including a member movable longitudinally of the case plate, and means upon the inner side of the runway for actuating said member.

13. The combination with the door having a runway for a vertically movable glass panel, of a latch having a case plate secured to said door, a latch bolt carried by said case plate, a roll-back journaled in said case plate upon the outer side of said runway for retracting the bolt, a lever operable from the inner side of the runway having an arm upon the outer side of the runway for retracting the bolt, a member movable laterally of the case plate for dogging the roll-back, means carried by the case plate normally holding said member inoperative adapted to be actuated by the lever arm for moving the member into operative engagement with the roll-back, and means carried by the case plate engageable with the arm for holding said member in operative dogging engagement with the roll-back.

14. The combination with the door having a runway for a vertically movable glass panel, of a latch having a case plate secured to said door, a latch bolt carried by the case plate having a lateral projection and a depending extension, of a roll-back operable from the outside of the runway engageable with the depending extension for retracting the bolt, and a lever operable from the inside of the runway having an arm upon the outer side of the runway engageable with the lateral projection for retracting the bolt.

15. The combination with a door having a runway for a movable glass panel, of latch mechanism carried by the door including a latch bolt upon one side of the runway, and an operating handle upon the opposite side of the runway having a transversely extending portion located exteriorly of the vertical edge of the door in advance of the runway and having an upstanding portion operatively connected to the bolt for retracting the same.

16. The combination with a door having a runway for a movable glass panel, of latch mechanism carried by the door including a latch bolt upon one side of the runway, and actuating means for said latch bolt including a U-shaped member straddling the runway with the base of the U located in advance of the runway and exteriorly of the vertical edge of the door, one arm of the U being operatively connected to the latch bolt, and the other arm of the U serving as the operating member.

17. The combination with a door having a runway for a movable glass panel, of latch mechanism carried by the door including a latch bolt upon one side of the runway, and actuating means for said latch bolt including single U-shaped means extending around the runway at the adjacent vertical edge of the door.

18. The combination with a door having a runway for a movable glass panel, of latch mechanism carried by the door including a latch bolt upon one side of the runway, and actuating means for said latch bolt including a U-shaped member extending around the adjacent vertical edge of the door and terminating on opposite sides of the runway.

19. The combination with a door having a runway for a movable glass panel, of latch mechanism carried by the door including a latch bolt upon one side of the runway, a lateral projection on the bolt, and actuating means for said bolt including means straddling the runway at the vertical edge of the door and operatively connected to said lateral projection.

20. The combination with a door having a runway for a movable glass panel, of latch mechanism carried by the door including a latch bolt upon one side of the runway, and an operating means upon the opposite side of the runway including a U-shaped member having a portion extending transversely of the door at a vertical edge thereof, and having another portion operatively connected to said bolt for retracting the same.

21. The combination with a door having a runway for a movable glass panel, of latch mechanism carried by the door including a latch bolt upon one side of the runway, and an operating handle upon the opposite side of the runway including a U-shaped member having a portion extending across a vertical edge of the door in advance of the runway and operatively connected to the bolt for retracting the same.

22. In combination, an automobile door having a jamb rail provided with a projection from the face thereof, and a latch mechanism arranged interiorly of the door and provided with interior and exterior operating means one of which is connected with the latch mechanism by means passing through said projection.

23. In combination, an automobile door having a jamb rail provided with a projection from its jamb face, and a latch mechanism arranged interiorly of the door by means of which the door is latched having interior and exterior elements inter-locked by a member which passes through said projection.

24. The combination with a door having a run-way for a vertically movable glass panel, of a latch having a case plate associated with the run-way, a bolt having a shank movable over a portion of the case plate on one side of the run-way, and means carried by a portion of the case plate on the other side of the runway for retracting the bolt.

25. The combination with a door having a runway for a vertically movable glass panel, of a latch having a case plate associated with the run-way, a bolt having a shank movable over a portion of the case plate on one side of the runway, and means movable exteriorly of the door for actuating the bolt from the outside of the door.

26. The combination with a door having a run-way for a vertically movable glass panel, of a latch having a case plate associated with the run-way, a bolt having a shank movable over a portion of the case plate, and means for actuating the bolt straddling the case plate.

27. The combination with a door having a runway for a movable glass panel, of latch mechanism carried by the door including a latch bolt upon one side of the runway, a rollback upon the same side of the runway for retracting the bolt, and actuating means for the rollback including an operating member upon the other side of the runway, and a connection between said member and rollback extending transversely of the door and exteriorly of the forward vertical edge thereof.

28. The combination with a door having a runway for a movable glass panel, of latch mechanism carried by the door including a latch bolt upon one side of the runway a rollback upon the same side of the runway for retracting the bolt, and actuating means for the rollback including an operating member upon the other side of the runway, and an operating connection between said member and rollback including means straddling the runway at the adjacent vertical edge of the door.

29. The combination with a door having a runway for a movable glass panel, of latch mechanism carried by the door including a latch bolt upon one side of the runway, a rollback upon the same side of the runway for retracting the bolt, and actuating means for the rollback including means extending around the adjacent vertical edge of the door.

30. The combination with a door having a runway for a movable glass panel, of latch mechanism carried by the door including a latch bolt upon one side of the runway, a rollback upon the same side of the runway for retracting the bolt, and actuating means for the rollback including means extending around the runway at the adjacent vertical edge of the door.

31. The combination with a door, of latch mechanism carried thereby at the vertical free edge thereof including a latch bolt located at and normally projecting beyond the outer free edge of the door, a member upon the inner side of the door for actuating said bolt, a member upon the outer side of the door and operable independently of the member aforesaid for actuating said bolt, and an operating connection between the last mentioned member and said latch bolt extending across the free vertical edge of the door.

32. The combination with a door having a runway for a movable glass panel, of latch mechanism carried by the door including a latch bolt upon one side of the runway, and an operating handle upon the opposite side of the runway having a transversely extending portion located adjacent the vertical edge of the door in advance of the runway, and having an upstanding portion operatively connected to the bolt for retracting the same.

33. The combination with a door having a runway for a movable glass panel, of latch mechanism carried by the door including a latch bolt upon one side of the runway, and actuating means for said latch bolt including a U-shaped member straddling the runway with the base of the U located in advance of the runway and adjacent the vertical edge of the door, one arm of the U being operatively connected to the latch bolt, and the other arm of the U having connection with an operating member.

34. The combination with a door having a runway for a movable glass panel, of latch mechanism carried by the door including a latch bolt upon one side of the runway, a lateral projection associated with the bolt, and actuating means for said bolt including means straddling the runway at the vertical edge of the door and operatively connected to said lateral projection.

35. An automobile door having a sliding member substantially the full width of the body of the door, a latch on the door at one side of the path of movement of said sliding member, latch operating mechanism on the door positioned at opposite sides of the path of movement of said sliding member, a substantially U-shaped member operatively associated with said latch operating mechanism, with the base of said U-shaped member extending transversely adjacent the free edge of the door, and means for journalling said U-shaped member to the door while maintaining the full width body of the door for the free movement of said slidable member.

WILLIAM MARSHALL.
JOHN LEVANDOSKI.